US012340815B2

(12) United States Patent
Tien et al.

(10) Patent No.: US 12,340,815 B2
(45) Date of Patent: Jun. 24, 2025

(54) AUDIO COMPRESSION SYSTEM, AND AUDIO COMPRESSION METHOD FOR WIRELESS COMMUNICATION

(71) Applicant: SAVITECH CORP., New Taipei (TW)

(72) Inventors: Sing-Ban Robert Tien, New Taipei (TW); Wen-Wei Kang, New Taipei (TW); Wu-Lin Chang, New Taipei (TW); Chi-Feng Huang, New Taipei (TW); Lee-Chang Pang, New Taipei (TW)

(73) Assignee: SAVITECH CORP., New Taipei (TW)

( * ) Notice: Subject to any disclaimer, the term of this patent is extended or adjusted under 35 U.S.C. 154(b) by 429 days.

(21) Appl. No.: 17/959,325

(22) Filed: Oct. 4, 2022

(65) Prior Publication Data

US 2024/0112688 A1 Apr. 4, 2024

(51) Int. Cl.
*G10L 19/08* (2013.01)
*G10L 19/00* (2013.01)
*G10L 19/16* (2013.01)

(52) U.S. Cl.
CPC .......... *G10L 19/08* (2013.01); *G10L 19/0017* (2013.01); *G10L 19/167* (2013.01)

(58) Field of Classification Search
None
See application file for complete search history.

(56) References Cited

U.S. PATENT DOCUMENTS

| | | | | |
|---|---|---|---|---|
| 8,990,076 B1 * | 3/2015 | Strom | G10L 15/02 704/236 |
| 2017/0200454 A1 * | 7/2017 | Srinivasan | H04L 65/61 |
| 2023/0154478 A1 * | 5/2023 | Lee | H04L 1/0014 704/500 |

FOREIGN PATENT DOCUMENTS

| | | |
|---|---|---|
| TW | 1466106 B | 12/2014 |

OTHER PUBLICATIONS

Liebchen and Reznik, "MPEG-4 ALS: an Emerging Standard for Lossless Audio Coding", IEEE Proc. of the Data Compression Conference (DCC'04), 2004. (Year: 2004).*

* cited by examiner

*Primary Examiner* — Nicole A K Schmieder

(57) ABSTRACT

The present disclosure provides an audio compression device, an audio compressing system and an audio compression method. The audio compression device comprises a first transceiver and a first processor. The first transceiver is connected to the first processor. The processor obtains an audio signal and an available bandwidth, and the processor performs an audio compression encoding on the audio signal to obtain a sample audio signal, and then compares with the audio signal and the sample audio signal to generate a residual signal, and the residual signal is transmitted according to the available bandwidth. The audio signal can be completely transmitted to an audio decompression device to reduce the distortion of the audio signal.

5 Claims, 15 Drawing Sheets

AUDIO COMPRESSION SYSTEM, AND AUDIO COMPRESSION METHOD FOR WIRELESS COMMUNICATION

BACKGROUND

Technical Field

The present disclosure provides a signal compression device, a signal compression system, and a signal compression method, in particular an audio signal compression device, an audio signal compression system, and an audio signal compression method.

Related Art

With the popularization and advancement of mobile devices and network technology, people are more frequently listening to audio signals (such as online media, music, radio, etc.) through the internet on mobile devices. For providing a better audio-listening experience, creators have put effort into refining audio signals, resulting in a greatly increased signal bandwidth for the audio signal.

Conventional audio compression system on the market normally includes a mobile device and a wireless Bluetooth headset, where the mobile device could be connected to the wireless Bluetooth headset through a Bluetooth signal protocol. After the mobile device compresses and encodes an audio signal according to the Bluetooth signal protocol, the compressed and encoded audio signal can be transmitted to the wireless Bluetooth headset audio signal. When the wireless Bluetooth headset receives the compressed and encoded audio signal, the compressed and encoded audio signal could be decoded to generate an audio signal.

However, in the audio compression system of prior arts, since the mobile device is limited by the bandwidth specified by the communication protocol when transmitting audio signals, the mobile device need to compress and encode the audio signal by removing redundant information, so that a part of the audio signal would be discarded. When the wireless Bluetooth headset receives the compressed and encoded audio signal and decodes it, the audio signal decoded by the wireless Bluetooth headset and the audio signal of the mobile device would show differences as a part of the data is discarded, causing the audio signal to be distorted. Thus, audio signals could not be completely obtained.

Therefore, it is necessary to provide an improved solution to prior arts.

SUMMARY

In view of the above deficiencies of prior arts, embodiments of the present disclosure provide an audio signal compression device, an audio signal compression system, and an audio signal compression method. A residual signal is transmitted through the available bandwidth so that the audio signal can be completely transmitted to an audio decompression device to reduce distortion of an audio signal.

The aforementioned audio compression device of the main technical means used to achieve the above purpose comprises:

a first signal transceiver; and a first processor connected to the first signal transceiver, obtaining an audio signal and an available bandwidth;

wherein the first processor performs an audio compression encoding to the audio signal to obtain a sample audio signal, performs a comparison procedure with the audio signal and the sample audio signal to generate a residual signal, and transmits the residual signal according to the available bandwidth.

With the above configuration, the first processor enables the residual signal to be transmitted through the available bandwidth. In this way, the residual signal would not be lost, so as to reduce distortion of the audio signal.

The aforementioned audio compression system of another main technical means used to achieve the above purpose comprises:

an audio compression device according to the above aspect; and an audio decompression device connected to the audio compression device for wireless communication, and receiving a plurality of residual encoding frames from the audio compression device;

wherein, when receiving the residual encoding frames, the audio decompression device could perform an audio compression decoding to the residual encoding frames to generate a residual signal and could perform a signal superposition computation according to the residual signal to generate an audio signal.

With the above configuration, the audio compression device could transmit the residual encoding frames to the audio decompression device through the available bandwidth. After the audio decompression device further decodes the residual encoding signal, the signal superposition computation is performed to generate the audio signal. In this way, the residual signal would not be lost and can be restored to the audio signal to reduce the distortion of the audio signal.

Another main technical means used to achieve the above purpose is the aforementioned audio compression method, which is mainly performed by an audio compression device, comprising the following steps:

receiving an audio signal;

performing an audio compression encoding to the audio signal to obtain a sample audio signal;

performing a comparison procedure to the audio signal and the sample audio signal to generate a residual signal;

obtaining an available bandwidth; and transmitting the residual signal according to the available bandwidth.

Through the above method, the residual signal can be transmitted through the available bandwidth. In this way, the residual signal would not be lost, so as to reduce the distortion of the audio signal.

It should be understood, however, that this summary may not contain all aspects and embodiments of the present disclosure, that this summary is not meant to be limiting or restrictive in any manner, and that the disclosure as disclosed herein will be understood by one of ordinary skill in the art to encompass obvious improvements and modifications thereto.

BRIEF DESCRIPTION OF THE DRAWINGS

The features of the exemplary embodiments believed to be novel and the elements and/or the steps characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION OF THE EMBODIMENTS

The present disclosure will now be described more fully hereinafter with reference to the accompanying drawings, in which exemplary embodiments of the disclosure are shown. This present disclosure may, however, be embodied in many different forms and should not be construed as limited to the embodiments set forth herein. Rather, these embodiments are provided so that this present disclosure will be thorough and complete, and will fully convey the scope of the present disclosure to those skilled in the art.

Certain terms are used throughout the description and following claims to refer to particular components. As one skilled in the art will appreciate, manufacturers may refer to a component by different names. This document does not intend to distinguish between components that differ in name but function. In the following description and in the claims, the terms "include/including" and "comprise/comprising" are used in an open-ended fashion, and thus should be interpreted as "including but not limited to". "Substantial/substantially" means, within an acceptable error range, the person skilled in the art may solve the technical problem in a certain error range to achieve the basic technical effect.

The following description is of the best-contemplated mode of carrying out the disclosure. This description is made for the purpose of illustration of the general principles of the disclosure and should not be taken in a limiting sense. The scope of the disclosure is best determined by reference to the appended claims.

Moreover, the terms "include", "contain", and any variation thereof are intended to cover a non-exclusive inclusion. Therefore, a process, method, object, or device that includes a series of elements not only includes these elements, but also includes other elements not specified expressly, or may include inherent elements of the process, method, object, or device. If no more limitations are made, an element limited by "include a/an . . . " does not exclude other same elements existing in the process, the method, the article, or the device which includes the element.

Figure 1:
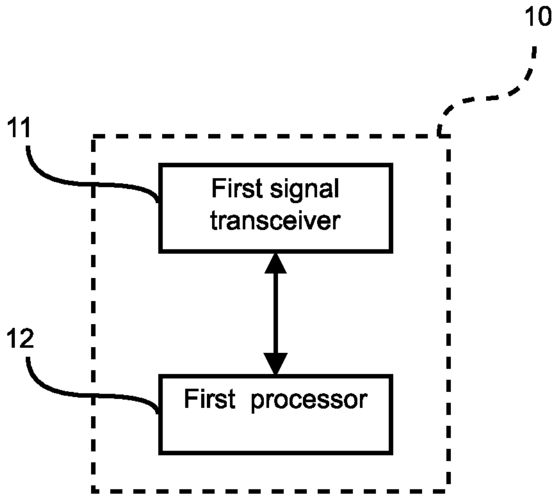
FIG. 1 is a schematic diagram of an audio compression device according to an embodiment of the present disclosure.

Regarding an embodiment of the present disclosure, as shown in FIG. 1, the present disclosure provides an audio compression device 10, which comprises a first signal transceiver 11 and a first processor 12. The first signal transceiver 11 is electrically connected to the first processor 12. In this embodiment, the audio compression device 10 could be a desktop host, a laptop computer, a mobile device, an audio player, etc.

Specifically, the first processor 12 could obtain an audio signal and an available bandwidth and performs an audio compression encoding to the audio signal to obtain a sample audio signal. The first processor 12 could perform a comparison procedure to the audio signal and the sample audio signal to generate a residual signal and transmits the residual signal through the first signal transceiver 11 according to the available bandwidth.

Figure 2:
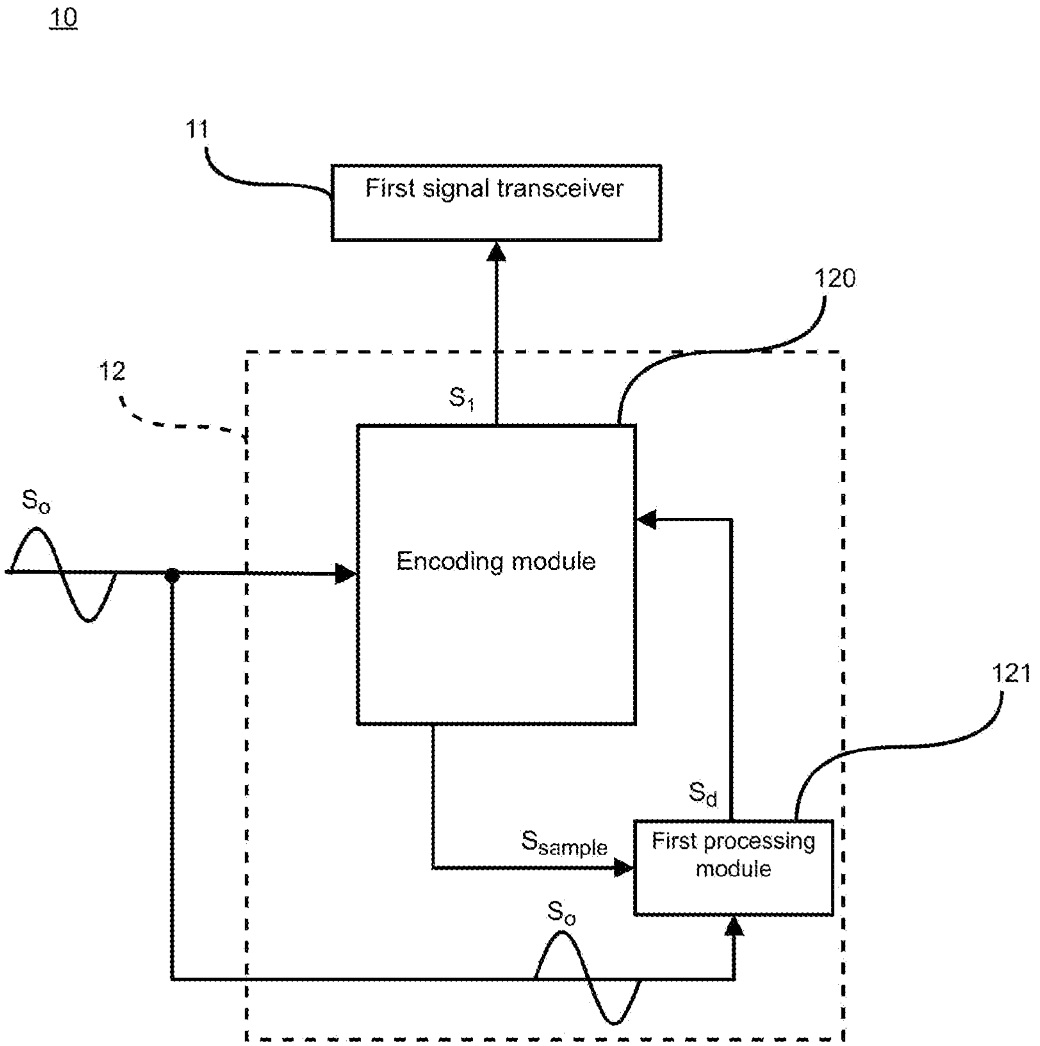
FIG. 2 is another schematic diagram of the audio compression device according to an embodiment of the present disclosure.

In this embodiment, as shown in FIG. 2, the first processor 12 comprises an encoding module 120 and a first processing module 121. The encoding module 120 is connected to the first signal transceiver 11 and the first processing module 121. The encoding module 120 performs the audio compression encoding to the audio signal $S_o$ to obtain the sample audio signal $S_{sample}$. Then, the sample audio signal $S_{sample}$ is transmitted to the first processing module 121. The first processing module 121 performs the comparison procedure to the audio signal $S_o$ and the sample audio signal $S_{sample}$ to generate the residual signal $S_d$. Next, the first processing module 121 obtains the transmission bandwidth according to a wireless communication signal connection, and obtains an occupied bandwidth used by the sample audio signal, and also performs a bandwidth difference computation according to the transmission bandwidth and the occupied bandwidth to generate the available bandwidth. Meanwhile, the residual signal $S_d$ can be transmitted to the encoding module 120 to perform the audio compression encoding to obtain a plurality of residual headers and a residual encoding signal.

Figure 3:
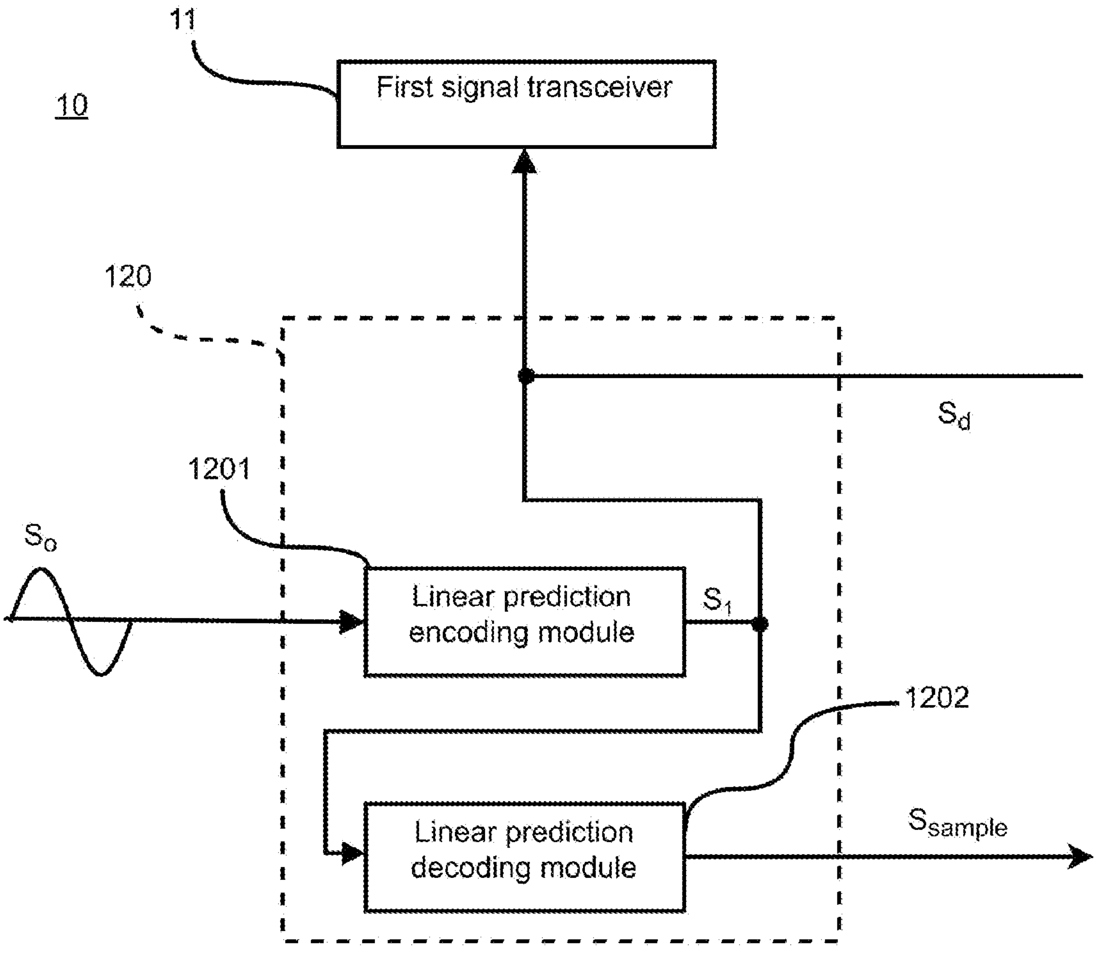
FIG. 3 is yet another schematic diagram of the audio compression device according to an embodiment of the present disclosure.

In this embodiment, as shown in FIG. 3, the encoding module 120 comprises a linear prediction encoding module 1201 and a linear prediction decoding module 1202. The linear prediction encoding module 1201 is connected to the first signal transceiver 11, and the linear prediction decoding module 1202 is connected to the linear prediction encoding module 1201 and the first processing module 121. When receiving the audio signal $S_o$, the linear prediction coding module 1201 would perform a lossless audio encoding to the audio signal $S_o$ to obtain a sample residual encoding signal $S_1$. Then, the sample residual encoding signal $S_1$ is transmitted to the linear prediction decoding module 1202, and the linear prediction decoding module 1202 could perform a lossless audio decoding to the sample residual encoding signal $S_1$ to obtain the sample audio signal $S_{sample}$.

In this embodiment, the first processing module 121 performs the comparison procedure according to the audio signal $S_o$ and the sample audio signal $S_{sample}$, where the comparison procedure performs a difference computation to the audio signal $S_o$ and the sample audio signal $S_{sample}$ to generate the residual signal $S_d$, which is the signal difference between the audio signal $S_o$ and the sample audio signal $S_{sample}$.

Specifically, the linear prediction encoding module 1201 performs a linear prediction audio encoding to the audio signal $S_o$ to generate a plurality of linear prediction sample residual encoding coefficients and a sample residual encoding signal $S_1$. The first processing module 121 sets a plurality of sample residual headers according to the linear prediction sample residual encoding coefficients. Next, the linear prediction decoding module 1202 performs a linear prediction audio decoding on the sample residual encoding signal $S_1$ to generate the sample audio signal $S_{sample}$ correspondingly.

Next, the sample audio signal $S_{sample}$ can be transmitted to the first processing module 121. The first processing module 121 performs the difference computation according to the audio signal $S_o$ and the sample audio signal $S_{sample}$ to generate the residual signal $S_d$, and the residual signal $S_d$ is transmitted to the encoding module 120 to perform the audio compression encoding, so as to generate the residual headers and the residual encoding signal correspondingly. Next, the first processing module 121 performs a signal modulation to the sample residual headers, the sample residual encoding signal, the residual headers, and the residual encoding signal to correspondingly generate a plurality of sample residual header frames, a plurality of sample residual encoding frames, a plurality of residual header frames and a plurality of residual encoding frames, respectively. Then, the first processing module 121 could move the residual header frames and the residual encoding frames from an original time point to the available bandwidth according to the residual header frame, the residual encoding frame, and the available bandwidth. The first signal transceiver 11 could transmit the residual header frames and the residual encoding frames by using the available bandwidth.

Figure 4A:
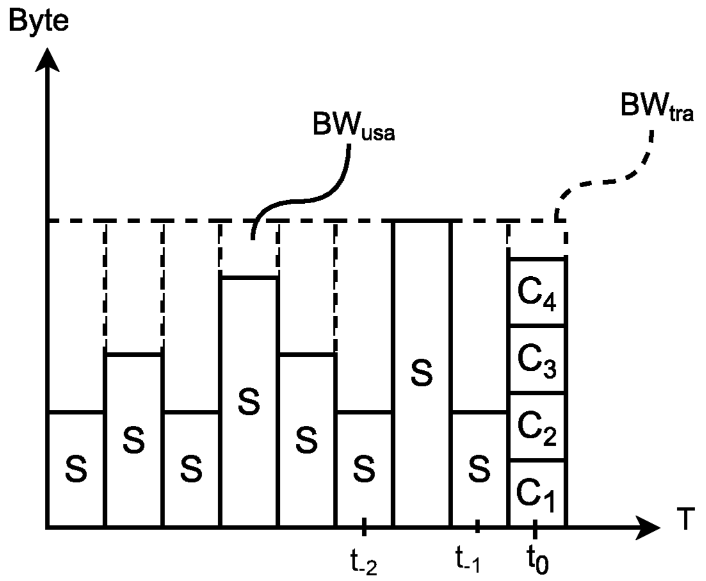
FIG. 4A is a schematic diagram of an audio compression signal of the present disclosure.
Figure 4B:
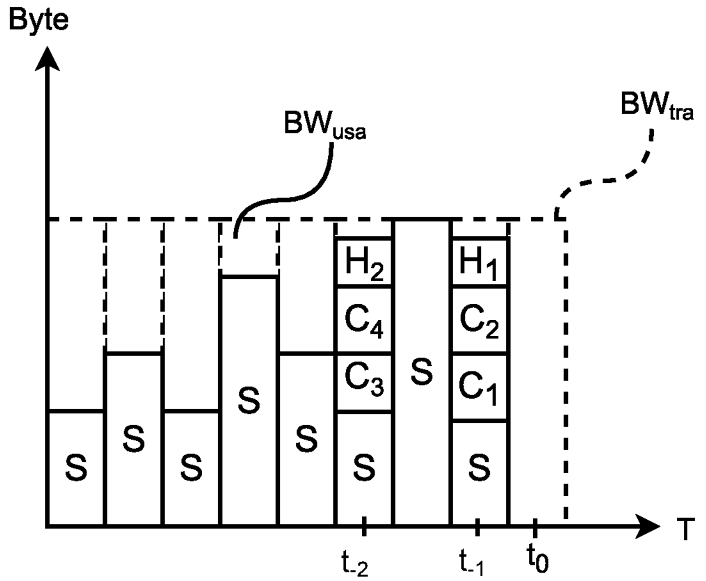
FIG. 4B is a schematic diagram of a residual signal transmitted by the audio compression signal according to an available bandwidth of the present disclosure.

In the above embodiment, as shown in FIG. 4A and FIG. 4B, it could be further described that the available bandwidth could obtain a transmission bandwidth $BW_{tra}$ defined by a wireless communication signal connection for signal transmission by the audio compression device 10. Next, obtain an occupied bandwidth (that is, at locations marked S, $C_1$, $C_2$, $C_3$, $C_4$) required for the transmission bandwidth of the sample residual header frames and the sample residual coding frames (that is, at locations marked S). Next, a bandwidth difference computation is performed according to the transmission bandwidth $BW_{tra}$ and the occupied bandwidth to generate the available bandwidth $BW_{usa}$. In this embodiment, the residual header frames $H_1$ and $H_2$ are 3 bytes, and the residual encoding frames $C_1$, $C_2$, $C_3$, and $C_4$ are 8 bytes.

Figure 5:
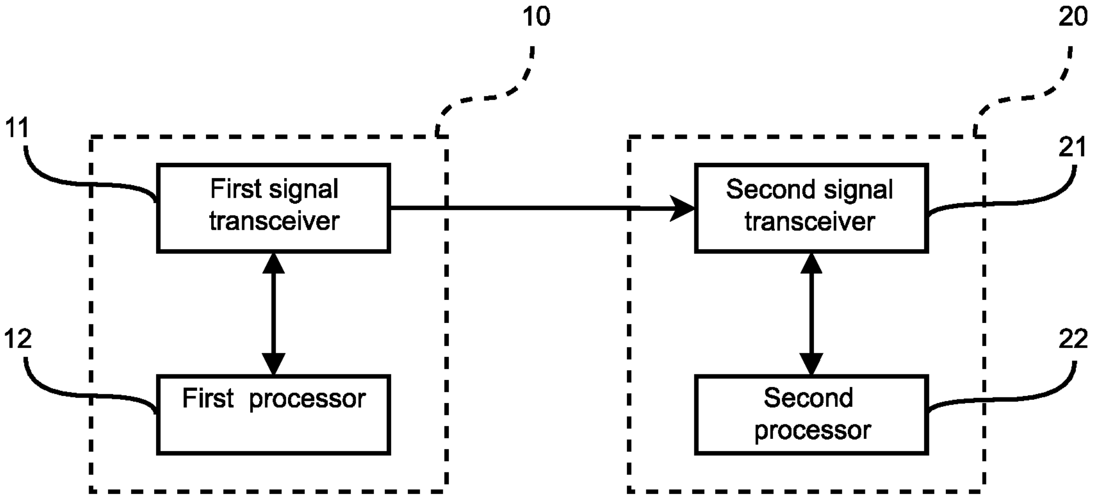
FIG. 5 is a schematic diagram of an audio compression system of the present disclosure.

Besides, in an audio compression system according to another embodiment of the present disclosure, as shown in FIG. 5, the audio compression system comprises the above audio compression device 10 and an audio decompression device 20, where the audio decompression device 20 is connected to the audio compression device 10 via a wireless communication signal link. In this embodiment, the wireless communication signal link could be a Bluetooth signal, a Wi-Fi signal, etc.

Then, the audio decompression device 20 receives a plurality of residual encoding frames from the audio compression device 10, and performs an audio compression decoding to the residual encoding frames to generate the residual signal, and also performs a signal superposition computation according to the residual signal to generate the audio signal $S_o$.

In this embodiment, the audio decompression device 20 comprises a second signal transceiver 21 and a second processor 22. The second signal transceiver 21 is connected to the first signal transceiver 11 by wireless signals, and the second processor 22 is connected to the second signal transceiver 21. Then, the second signal transceiver 21 receives the residual encoding frames from the first signal transceiver 11, and the second processor 22 moves the residual encoding frames from the available bandwidth to the original time point $t_0$ according to a plurality of headers of the residual encoding frames.

Figure 6:
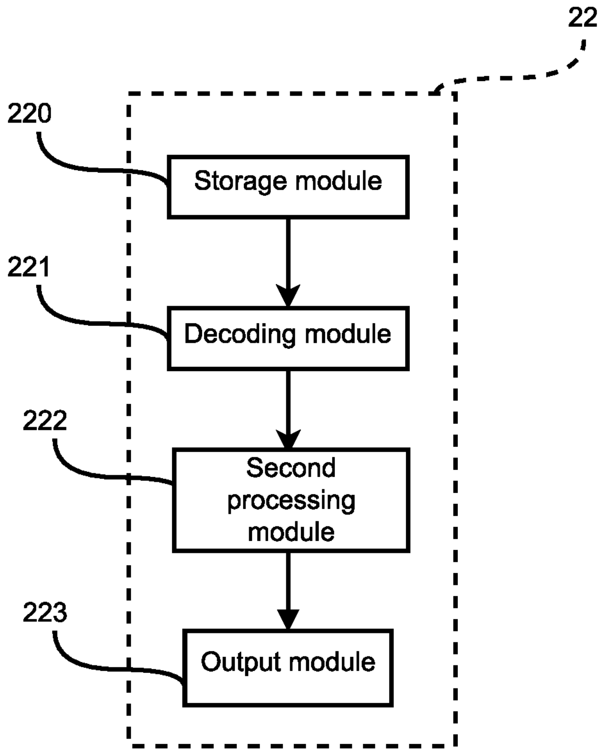
FIG. 6 is a schematic diagram of an audio decompression device of the present disclosure.

In this embodiment, as shown in FIG. 6, the second processor 22 comprises a storage module 220, a decoding module 221, a second processing module 222, and an output module 223. The storage module 220 is connected to the second signal transceiver 21 and the decoding module 221, and the second processing module 222 is connected to the decoding module 221 and the output module 223. When the second signal transceiver 21 receives the residual encoding frames, the residual encoding frames would be stored in the storage module 220. When a playback time of the output module 223 moves to the original time point $t_0$, the second processing module 222 would request the decoding module 221 to perform the audio compression decoding to the residual encoding frames to generate the residual signal. According to the headers and the original time point $t_0$, the residual signal $S_d$ can be moved to the original time point $t_0$ to output the audio signal $S_o$. In this embodiment, the wireless signal could be a Bluetooth signal, a wireless network signal, etc. In this embodiment, the audio decompression device 20 could be a wireless signal headset (e.g., a Bluetooth headset or a wireless network signal headset).

In the transmission bandwidth defined by the wireless communication signal link, when the sample audio frame is transmitted over the transmission bandwidth, it would occupy a part of the transmission bandwidth. The available bandwidth is then obtained by deducting the occupied bandwidth used by the sample audio frame from the transmission bandwidth. The residual coding frames could be transmitted with the available bandwidth so that the residual coding frames would not have to be discarded due to insufficient transmission bandwidth. In this way, the audio signal distortion can be reduced.

Figure 7:
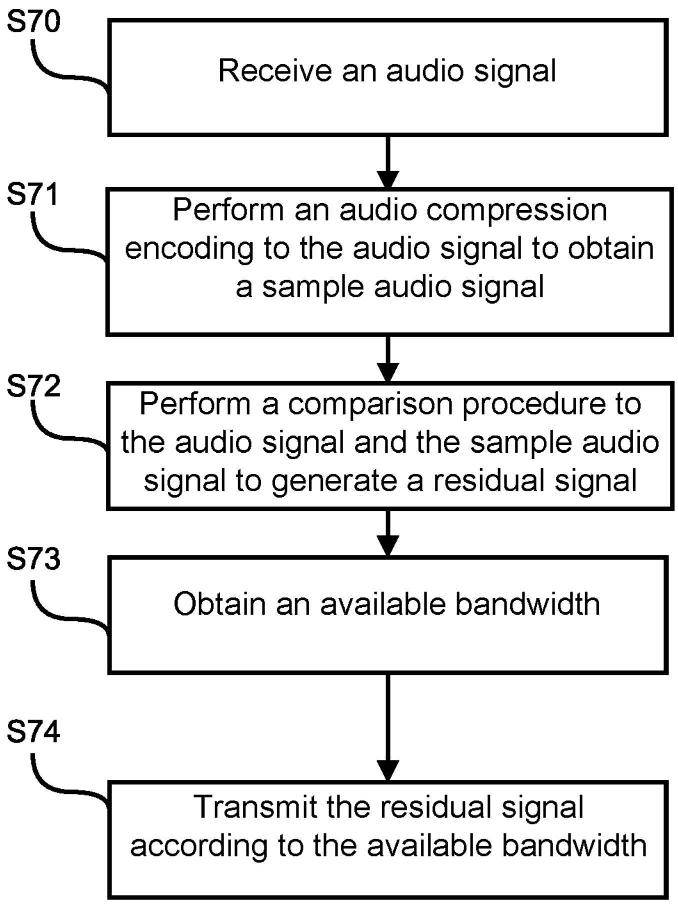
FIG. 7 is a flowchart of an embodiment of an audio compression method of the present disclosure.

In addition, in an embodiment of the audio compression method of the present disclosure, as shown in FIG. 7, the audio compression method is performed by an audio compression device 10 to perform the following steps:

- receiving an audio signal (S70);
- performing an audio compression encoding to the audio signal to obtain a sample audio signal (S71);
- performing a comparison procedure to the audio signal and the sample audio signal to generate a residual signal (S72);
- obtaining an available bandwidth (S73); and
- transmitting the residual signal according to the available bandwidth (S74).

Figure 8:
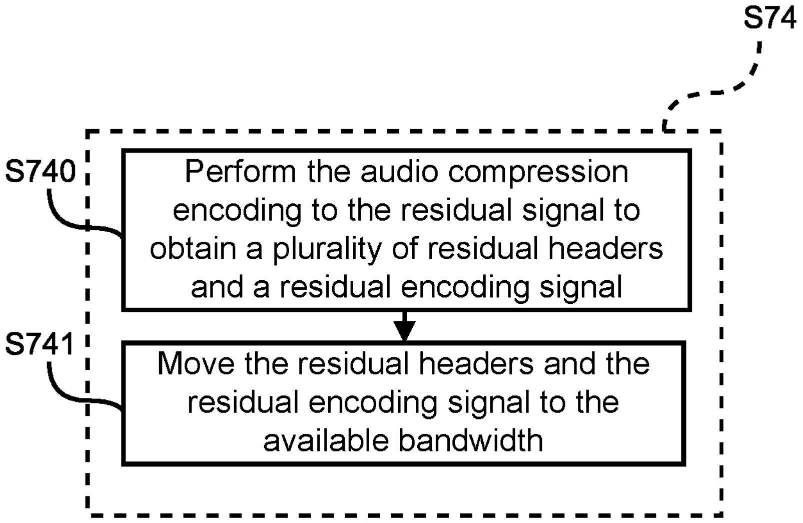
FIG. 8 is a flowchart of another embodiment of the audio compression method of the present disclosure.

In another embodiment of the audio compression method of the present disclosure, as shown in FIG. 8, wherein the step of transmitting the residual signal according to the available bandwidth (S74) comprises following sub-steps:

- performing the audio compression encoding to the residual signal to obtain a plurality of residual headers and a residual encoding signal (S740); and moving the residual headers and the residual encoding signal to the available bandwidth (S741).

Figure 9:
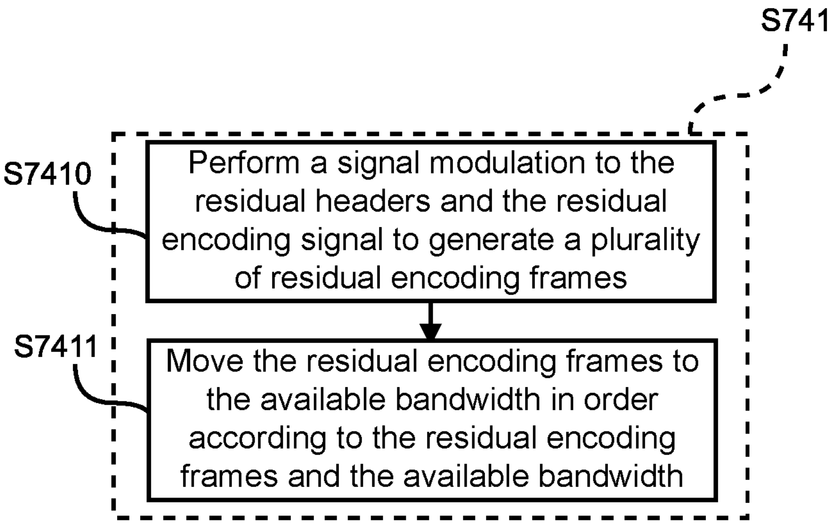
FIG. 9 is a flowchart of yet another embodiment of the audio compression method of the present disclosure.

In yet another embodiment of the audio compression method of the present disclosure, as shown in FIG. 9, wherein the step of moving the residual headers and the residual encoding signal to the available bandwidth (S741) comprises the following sub-steps:

performing a signal modulation to the residual headers and the residual encoding signal to generate a plurality of residual encoding frames (S7410); and moving the residual encoding frames to the available bandwidth in order according to the residual encoding frames and the available bandwidth (S7411).

Figure 10:
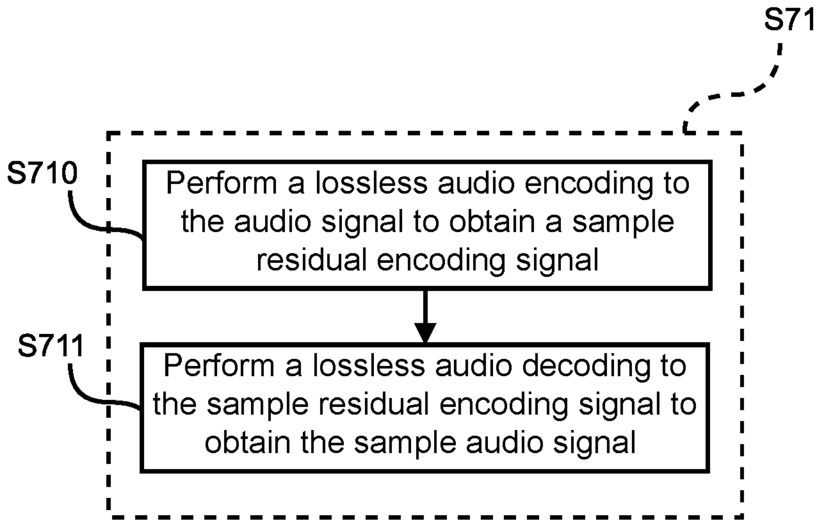
FIG. 10 is a flowchart of yet another embodiment of the audio compression method of the present disclosure.

In yet another embodiment of the audio compression method of the present disclosure, as shown in FIG. 10, wherein the step of performing the audio compression encoding to the audio signal to obtain the sample audio signal (S71) comprises following sub-steps:

performing a lossless audio encoding to the audio signal to obtain a sample residual encoding signal (S710); and performing a lossless audio decoding to the sample residual encoding signal to obtain the sample audio signal (S711).

Figure 11:
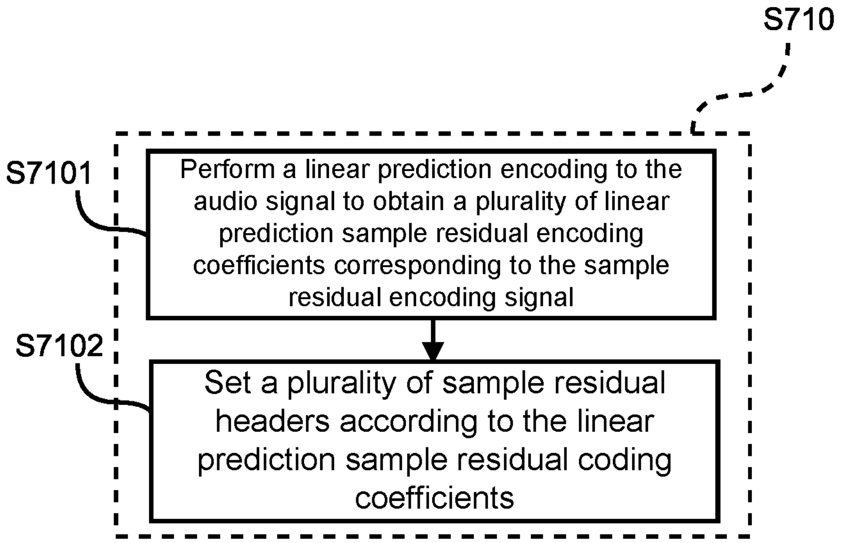
FIG. 11 is a flowchart of yet another embodiment of the audio compression method of the present disclosure.

In yet another embodiment of the audio compression method of the present disclosure, as shown in FIG. 11, wherein the step of performing the lossless audio encoding to the audio signal to obtain a sample residual encoding signal (S710) comprises the following sub-steps:

performing a linear prediction encoding to the audio signal to obtain a plurality of linear prediction sample residual encoding coefficients corresponding to the sample residual encoding signal (S7101); and setting a plurality of sample residual headers according to the linear prediction sample residual coding coefficients (S7102).

Figure 12:
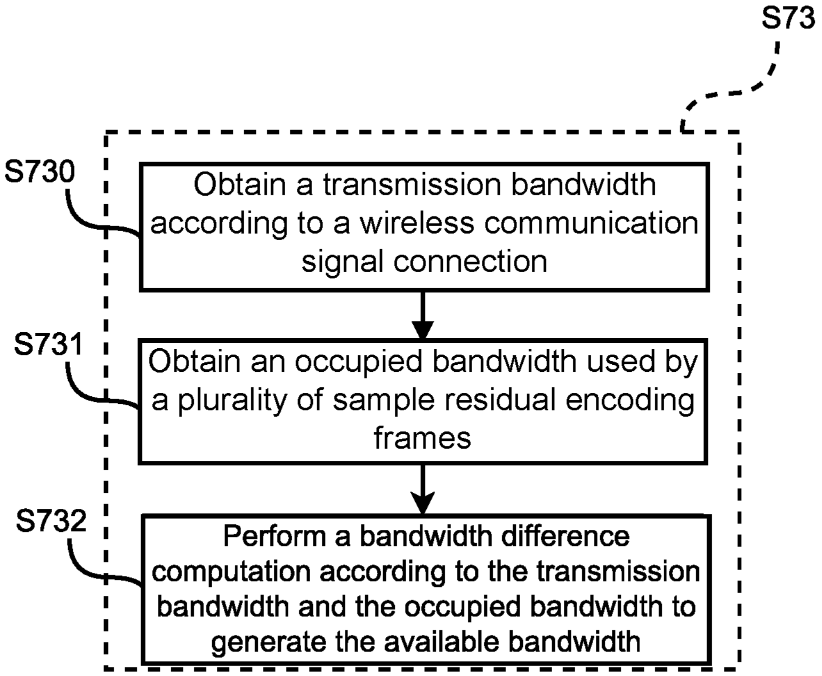
FIG. 12 is a flowchart of yet another embodiment of the audio compression method of the present disclosure.

In yet another embodiment of the audio compression method of the present disclosure, as shown in FIG. 12, wherein the step of obtaining the available bandwidth (S73) comprises the following sub-steps:

obtaining a transmission bandwidth according to a wireless communication signal connection (S730);

obtaining an occupied bandwidth used by a plurality of sample residual encoding frames (S731); and performing a bandwidth difference computation according to the transmission bandwidth and the occupied bandwidth to generate the available bandwidth (S732).

Figure 13:
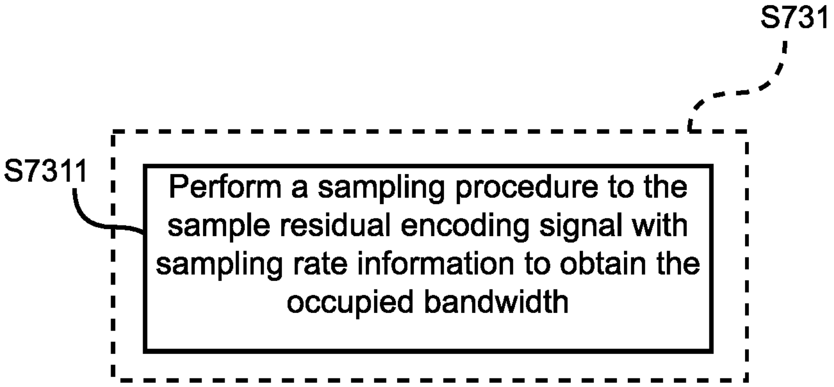
FIG. 13 is a flowchart of yet another embodiment of the audio compression method of the present disclosure.

In yet another embodiment of the audio compression method of the present disclosure, as shown in FIG. 13, wherein the step of obtaining the occupied bandwidth used by the sample residual encoding frames (S731) comprises the following sub-step:

performing a sampling procedure to the sample residual encoding signal with sampling rate information to obtain the occupied bandwidth (S7311). In this embodiment, the sampling rate information is a sampling frequency and a sampling bandwidth size, and the sampling rate information is smaller than a communication sampling rate information of the wireless communication signal link.

Figure 14:
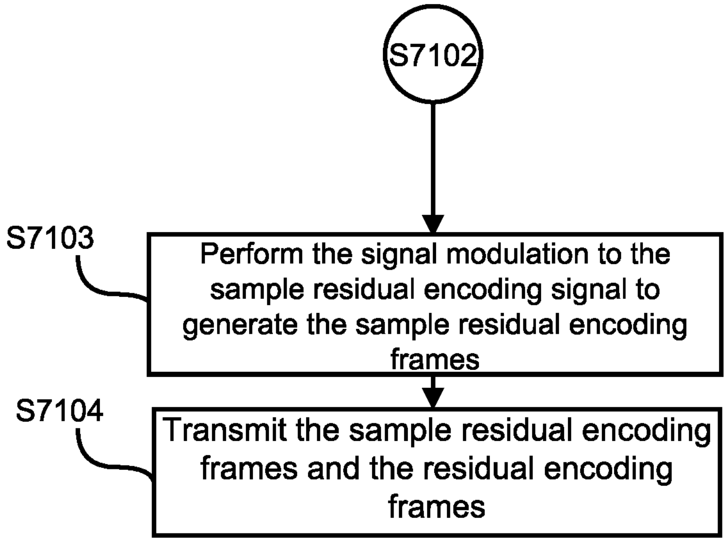
FIG. 14 is a flowchart of yet another embodiment of the audio compression method of the present disclosure.

In yet another embodiment of the audio compression method of the present disclosure, as shown in FIG. 14, wherein the step of setting the sample residual headers according to the linear prediction sample residual encoding coefficients (S7102) comprises the following sub-steps:

performing the signal modulation to the sample residual encoding signal to generate the sample residual encoding frames (S7103); and transmitting the sample residual encoding frames and the residual encoding frames (S7104).

Figure 15:
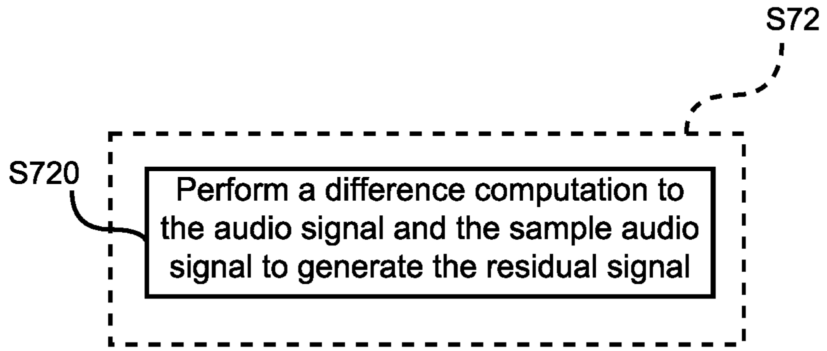
FIG. 15 is a flowchart of yet another embodiment of the audio compression method of the present disclosure.

In yet another embodiment of the audio compression method of the present disclosure, as shown in FIG. 15, wherein the step of performing the comparison procedure to the audio signal and the sample audio signal to generate the residual signal (S72) comprises the following sub-step:

performing a difference computation to the audio signal and the sample audio signal to generate the residual signal (S720).

In summary, the audio compression device 10 of the present disclosure could move the residual signal from the original time point to the available bandwidth before transmitting the residual signal to the audio decompression device 20 through the available bandwidth. Then, after the audio decompression device 20 receives the residual signal, the audio compression device 10 could identify the position of the residual signal in the available bandwidth according to the residual headers and could move the residual signal to the original time point in order. In this way, the loss of the residual encoding frames due to the compression of the audio signal during transmission can be avoided, thereby reducing the distortion of the audio signal.

It is to be understood that the term "comprises", "comprising", or any other variants thereof, is intended to encompass a non-exclusive inclusion, such that a process, method, article, or device of a series of elements not only comprise those elements but further comprises other elements that are not explicitly listed, or elements that are inherent to such a process, method, article, or device. An element defined by the phrase "comprising a . . . " does not exclude the presence of the same element in the process, method, article, or device that comprises the element.

Although the present disclosure has been explained in relation to its preferred embodiment, it does not intend to limit the present disclosure. It will be apparent to those skilled in the art having regard to this present disclosure that other modifications of the exemplary embodiments beyond those embodiments specifically described here may be made without departing from the spirit of the disclosure. Accordingly, such modifications are considered within the scope of the disclosure as limited solely by the appended claims.

What is claimed is:

1. An audio compression system for a bluetooth wireless communication, comprising:

an audio compression device for wireless communication, comprising:

a first signal transceiver;

a first processor connected to the first signal transceiver, obtaining an audio signal and an available bandwidth; and an encoding module connected to the first signal transceiver;

wherein the first processor performs an audio compression encoding to the audio signal to obtain a sample audio signal, performs a comparison procedure with the audio signal and the sample audio signal to generate a residual signal, performs a signal modulation to the residual signal to generate a plurality of residual encoding frames and transmits the residual signal according to the available bandwidth;

wherein the encoding module performs the audio compression encoding to the residual signal to obtain a plurality of residual headers and a residual encoding signal; and an audio decompression device connected to the audio compression device for wireless communication, comprising:

a second signal transceiver in communication with the first signal transceiver and receiving the residual encoding frames; and a second processor connected to the second signal transceiver, which moves the residual encoding frames from the available bandwidth to an original time point according to a plurality of headers of the residual encoding frames;

wherein, when receiving the residual encoding frames, the audio decompression device could perform an audio compression decoding to the residual encoding frames to generate the residual signal, and could perform a signal superposition computation according to the residual signal to generate the audio signal.

2. The audio compression system according to claim 1, wherein the second processor comprises:

a storage module connected to the second signal transceiver and storing the residual encoding frames;

a decoding module connected to the storage module; the decoding module performs the audio compression decoding to the residual encoding frames to generate the residual signal;

a second processing module connected to the decoding module; and an output module connected to the second processing module to output the residual signal;

wherein, when a playback time of the output module moves to the original time point, the second processing module would request the decoding module to perform the audio compression decoding to the residual encoding frames to generate the residual signal and would move the residual signal to the original time point according to the headers and the original time point.

3. An audio compression method for a bluetooth wireless communication performed by an audio compression device for wireless communication with the following steps:

receiving an audio signal;

performing a linear prediction audio encoding to the audio signal to generate a plurality of linear prediction sample residual encoding coefficients corresponding to a sample residual encoding signal;

setting, according the plurality of linear prediction sample residual encoding coefficients, a plurality of sample residual headers;

performing a lossless audio decoding to the sample residual encoding signal to obtain a sample audio signal;

performing a comparison procedure to the audio signal and the sample audio signal to generate a residual signal;

obtaining a transmission bandwidth according to a wireless communication signal connection;

performing a sampling procedure to the sample residual encoding signal with a sampling rate information to obtain the occupied bandwidth;

performing a bandwidth difference computation according to the transmission bandwidth and the occupied bandwidth to generate the available bandwidth;

performing an audio compression encoding to the residual signal to obtain a plurality of residual headers and a residual encoding signal;

performing a signal modulation to the residual headers and the residual encoding signal to generate a plurality of residual encoding frames; and moving the residual encoding frames to the available bandwidth in order according to the residual encoding frames and the available bandwidth.

4. The audio compression method according to claim 3, wherein the step of setting the sample residual headers according to the linear prediction sample residual encoding coefficients comprises the following sub-steps:

performing the signal modulation to the sample residual encoding signal to generate the sample residual encoding frames; and transmitting the sample residual encoding frames and the residual encoding frames.

5. The audio compression method according to claim 4, wherein the step of performing the comparison procedure to the audio signal and the sample audio signal to generate the residual signal comprises the following sub-step:

performing a difference computation to the audio signal and the sample audio signal to generate the residual signal.

* * * * *